US008921800B1

(12) United States Patent
Olechnowicz

(10) Patent No.: US 8,921,800 B1
(45) Date of Patent: Dec. 30, 2014

(54) COUNTERBALANCED VACUUM SEAL FOR NEUTRON DETECTORS

(71) Applicant: General Electric Company, Schenectady, NY (US)

(72) Inventor: Benjamin John Olechnowicz, Stow, OH (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 14/036,084

(22) Filed: Sep. 25, 2013

(51) Int. Cl.
*G01T 3/00* (2006.01)
*G01T 7/00* (2006.01)

(52) U.S. Cl.
CPC .... *G01T 3/00* (2013.01); *G01T 7/00* (2013.01)
USPC .................................................... 250/390.01

(58) Field of Classification Search
CPC ........................................................ G01T 3/06
USPC ....................................... 250/390.01–390.12
See application file for complete search history.

(56) References Cited

U.S. PATENT DOCUMENTS 3,397,310 A * 8/1968 Anderson et al. ............. 250/251
7,335,890 B2 2/2008 Utterback

* cited by examiner

*Primary Examiner* — Kiho Kim
(74) *Attorney, Agent, or Firm* — Cooper Legal Group, LLC

(57) ABSTRACT

An atomic particle detection assembly includes at least one detector that detects atomic particles. The atomic particle detection assembly includes a junction apparatus supporting the detector. The junction apparatus includes a first manifold attached to a first housing at an attachment location. The junction apparatus includes a sealing device sealing the first manifold with respect to the first housing along a sealing axis. The sealing axis is substantially parallel to and separated a first distance ($d_1$) from an attachment axis defined by the attachment location.

20 Claims, 7 Drawing Sheets

COUNTERBALANCED VACUUM SEAL FOR NEUTRON DETECTORS

BACKGROUND OF THE INVENTION

1. Field of the Invention

The present invention relates generally to a detection assembly and, in particular, to an atomic particle detection assembly maintaining one or more sealed environments.

2. Discussion of the Prior Art

Neutron detectors are used in neutron bombardment and scattering experiments. In a neutron detector, neutrons, ions, atomic particles, etc. resulting from neutron reactions within a cathode shell will collide with gas(es) contained within the shell to form free electrons. These free electrons are drawn to an anode, whereupon a signal is generated. This signal is transmitted to electronics (e.g., high voltage electronics) for analysis. Voltage breakdown in the high voltage electronics is possible as pressure in a chamber in which the voltage electronics are stored is reduced below atmospheric pressure. Accordingly, there is a need, and it would be beneficial, to provide a detector with a reduced likelihood of voltage breakdown.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides an atomic particle detection assembly including at least one detector configured to detect atomic particles. The atomic particle detection assembly includes a junction apparatus supporting the detector. The junction apparatus includes a first manifold attached to a first housing at an attachment location. The junction apparatus includes a sealing device sealing the first manifold with respect to the first housing along a sealing axis. The sealing axis is substantially parallel to and separated a first distance ($d_1$) from an attachment axis defined by the attachment location.

In accordance with another aspect, the present invention provides an atomic particle detection assembly including at least one detector configured to detect atomic particles. The atomic particle detection assembly includes a junction apparatus supporting the detector. The junction apparatus includes a first manifold including a first manifold opening. The junction apparatus includes a first housing including a first housing opening. The first housing is attached to the first manifold by an attachment device that extends along an attachment axis. The junction apparatus includes a sealing device sealing the first manifold opening with respect to the first housing opening. The first manifold opening and first housing opening extend along a sealing axis. The sealing axis is substantially parallel to and separated a first distance from the attachment axis.

In accordance with another aspect, the present invention provides an atomic particle detection assembly including at least one detector configured to detect atomic particles. The atomic particle detection assembly includes a junction apparatus supporting the detector, the junction apparatus includes a first housing. The junction apparatus includes a first manifold attached to the first housing at an attachment location. The first manifold includes a biasing portion that engages the first housing. The biasing portion can bias the first manifold towards the first housing.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
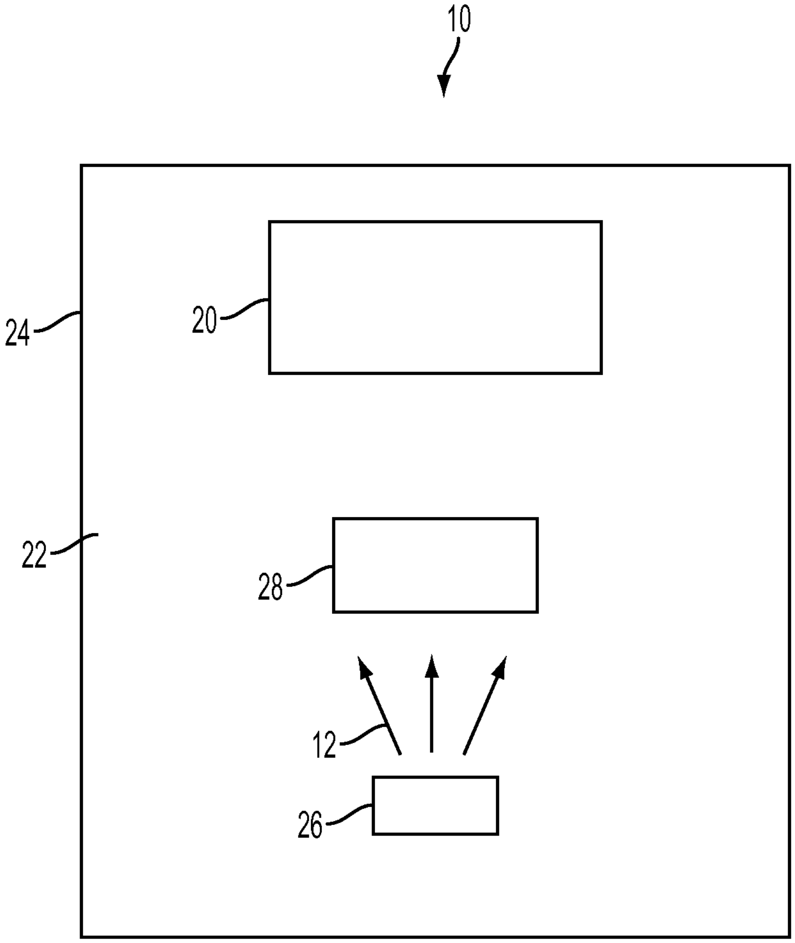
FIG. 1 is generic/schematic illustration of an example atomic particle detection assembly in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 depicts an example embodiment of an atomic particle detection assembly 10. It is to be appreciated that the atomic particle detection assembly 10 is illustrated somewhat generically/schematically for ease of illustration. In general, the atomic particle detection assembly 10 can detect atomic particles 12, including neutrons, etc.

The atomic particle detection assembly 10 includes a detection unit 20. The detection unit 20 is somewhat generically/schematically depicted for illustration purposes, as the detection unit 20 includes any number of constructions/configurations. In the illustrated example, the atomic particle detection assembly 10 includes one detection unit 20, but in other examples, may include any number (e.g., one or more) of detection units 20.

The detection unit 20 is positioned within a first chamber 22. The first chamber 22 is located within a chamber enclosure 24, which may include a housing, wall(s), surface(s), ceiling(s), etc. that define the first chamber 22. In some examples, the detection unit 20 may be attached to and/or supported by/within the chamber enclosure 24. The first chamber 22 includes any number of sizes, shapes, and configurations, and is not limited to the illustrated dimensions.

In an example, the first chamber 22 is maintained at a first operating pressure. For example, the chamber enclosure 24 may be evacuated of fluids, such as air and other gases, such that the chamber enclosure 24 defines a generally closed and/or sealed environment. In some examples, the first chamber 22 includes a negative operating pressure. In an example, the first operating pressure of the first chamber 22 approaches an absolute vacuum at zero Pascal (Pa). By maintaining the first chamber 22 at a negative operating pressure, atomic particle transport, including neutron transport, may be increased due to a reduced interaction between the atomic particles 12 and air molecules. Further, the likelihood of atomic particles 12 being scattered by air and, thus, escaping detection by the detection unit 20, is also mitigated by having the negative operating pressure.

The atomic particle detection assembly 10 includes a source 26 positioned within the first chamber 22. In the illustrated example, the source 26 may be positioned a distance away from the detection unit 20. The source 26 can emit atomic particles 12 (e.g., neutrons, for example). In an example, a material 28 is positioned within the first chamber 22 between the source 26 and the detection unit 20. The source 26 can emit atomic particles 12 that travel from the source 26 and towards the detection unit 20 and the material 28. At least some of the atomic particles 12 may interact with the material 28, causing scattering of the atomic particles 12. In an example, the detection unit 20 will detect at least a portion of the atomic particles 12 that have interacted with the material 28 and at least a portion of the atomic particles 12 that have not interacted with the material 28.

Figure 2:
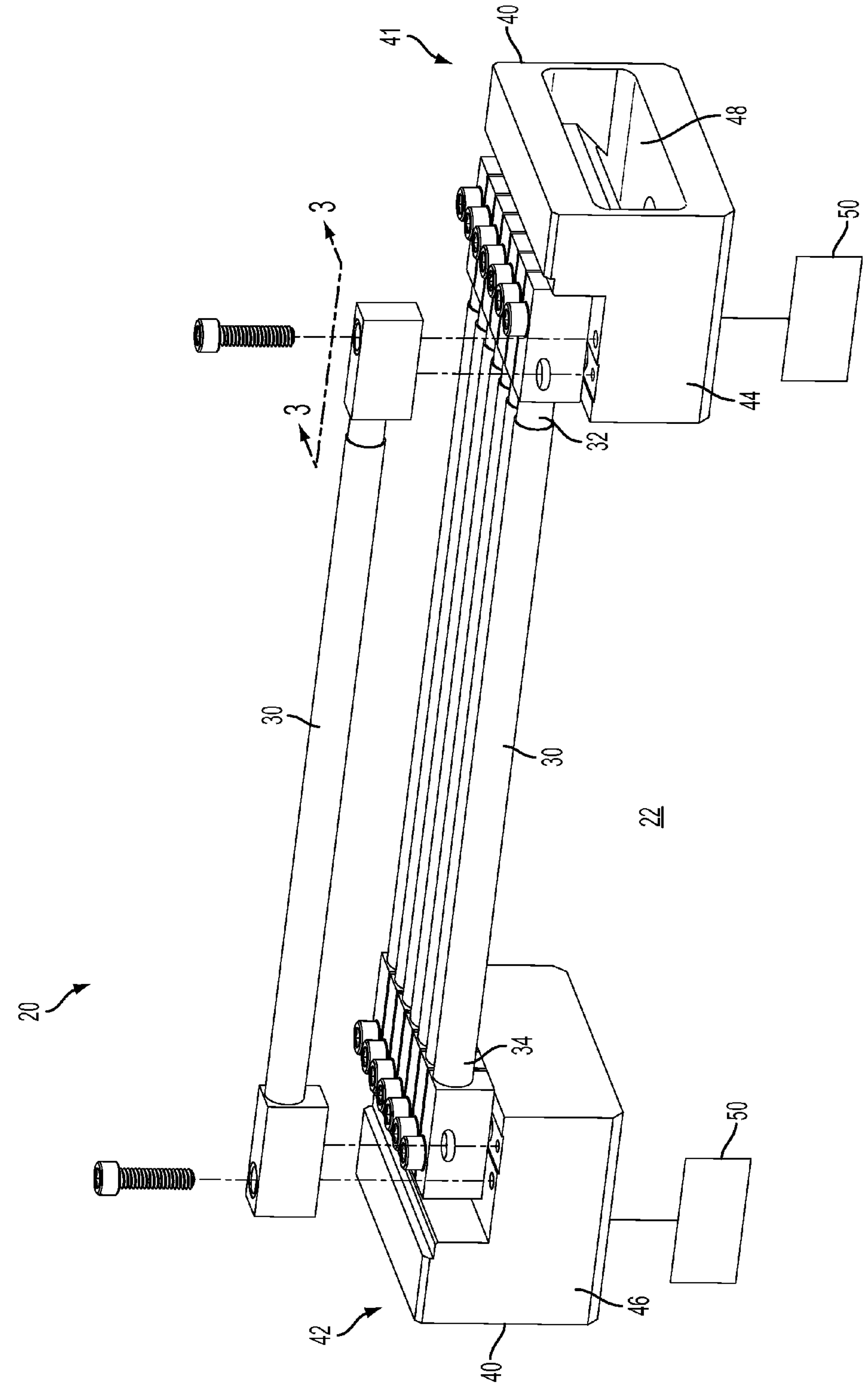
FIG. 2 is a partially torn open perspective view of an example detection unit for use in an atomic particle detection assembly.

Turning now to FIG. 2, an example of the detection unit 20 is illustrated. The detection unit 20 can include at least one position sensitive detector 30 (e.g., detectors 30, for example) that can detect the atomic particles 12. In an example, the detectors 30 can record where interaction of the atomic particles 12 occurs within the first chamber 22. This location determination can facilitate the study of atomic particle interactions. The detectors 30, as part of the detection unit 20, are positioned within the first chamber 22.

In the illustrated example, the detection unit 20 includes eight position sensitive detectors 30; though any number of position sensitive detectors 30 may be used. It is to be appreciated that FIG. 2 illustrates a single detection unit 20 including eight position sensitive detectors 30. In other examples, however, the atomic particle detection assembly 10 may include a plurality of detection units 20 (e.g., more than one detection unit 20), with each of the detection units 20 including one or more position sensitive detectors 30. Further, FIG. 2 illustrates one of the detectors 30 in a detached/exploded state for ease of illustration and to show the relative positions of the detectors 30. In operation, however, the detectors 30 will each be in an attached form.

The detectors 30 are each elongated, sealed tubes that extend between a first end 32 and an opposing second end 34. The position sensitive detectors 30 in this example extend generally parallel with respect to each other and are substantially contained within a plane. In an example, the detectors 30 are spaced apart from each other, with a gap, space, or the like extending between adjacent detectors 30. In other examples, however, the detectors 30 can be positioned in relatively close contact with each other, such that the size of the gap, space, etc. is reduced and/or minimized. In still further examples, the detectors 30 can be offset in multiple planes (e.g., two planes, for example) to minimize gaps. By reducing the size of this gap, space, etc. that separates adjacent detectors 30, the number of atomic particles 12 (e.g., neutrons, etc.) that pass through the gap, space, etc. without interacting with the detectors 30 is reduced. In another example, the detectors 30 can be positioned so as to be in contact with each other, such that the gap, space, etc. is eliminated. While the detectors 30 include any number of sizes and shapes, in one example, the detectors 30 each include a diameter of about 8 mm (0.31 inches). In other examples, the detectors 30 are not limited to the substantially cylindrical shape, and instead may include rectangular shapes, elliptical shapes, etc.

The detectors 30 can detect the atomic particles 12 within the first chamber 22. In an example, the detectors 30 are each substantially hollow, so as to form a sealed chamber. The sealed chamber of the detectors 30 can be evacuated of air and filled with gas(es) (e.g., $He_3$, etc.) that facilitate neutron detection. In some examples, detection structures, such as an anode, cathode, etc., are positioned within the sealed chamber of the detectors 30. In one example, the detectors 30 can detect low energy neutrons with energy levels less than approximately $3.2\times10^{-12}$ (20 MeV), for example. In other examples, the detectors 30 can detect nearly any type of atomic particles within any energy range that facilitates operation of the detectors 30.

The detection unit 20 includes at least one junction apparatus 40 for supporting the position sensitive detectors 30. In the illustrated example, the at least one junction apparatus 40 includes a pair of junction apparatuses 40 disposed at a first end 41 and an opposing second end 42 of the detection unit 20. In an example, one junction apparatus 40 can support the first end 32 of the position sensitive detectors 30. In an example, the other junction apparatus 40 can support the opposing second end 34 of the position sensitive detectors 30. It will be appreciated that the junction apparatuses 40 are generally identical to each other, and may be mirror images.

The junction apparatus 40 includes a first housing 44 and a second housing 46. In an example, the first housing 44 (illustrated as being partially torn open in FIG. 2) can be located at the first end 41 of the detection unit 20 while the second housing 46 is located at the second end 42 of the detection unit 20. The first housing 44 and second housing 46 can be substantially identical in structure. For example, each of the first housing 44 and second housing 46 can include a second chamber 48 positioned therein. The second chamber 48 defines a substantially hollow, closed structure that is sealed from the first chamber 22.

Figure 4:
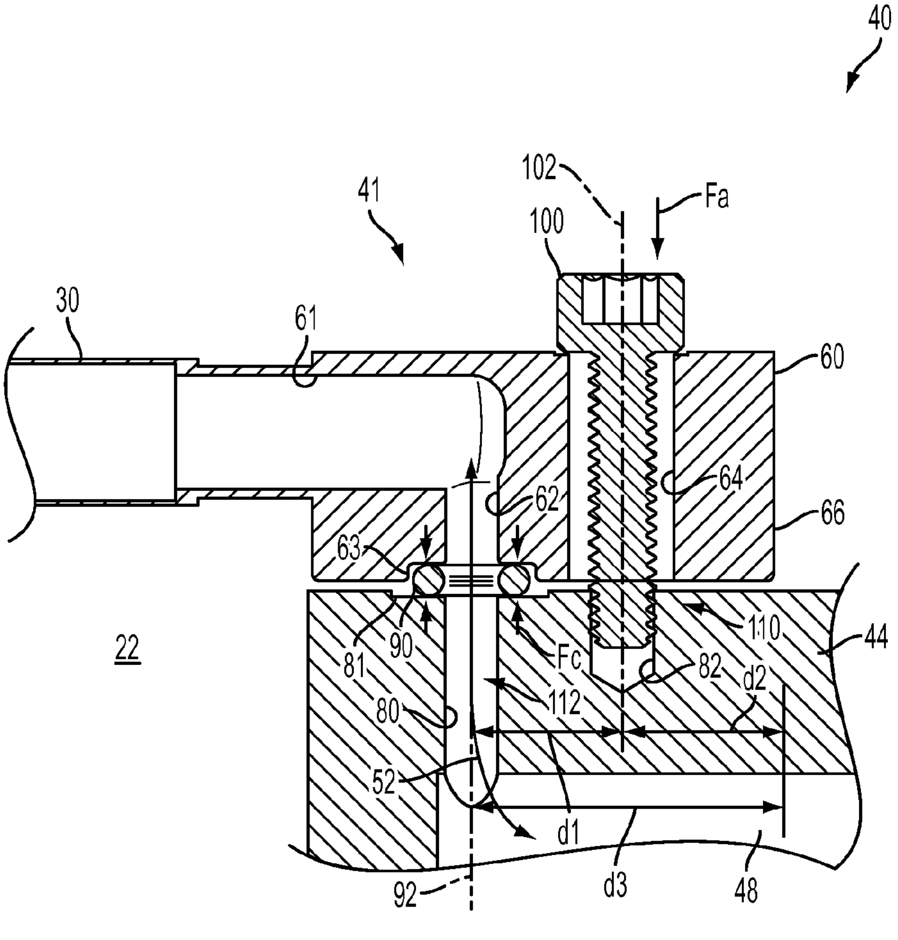
FIG. 4 is an enlarged sectional view similar to FIG. 3.

The second chamber 48 can support, for example, sensing electronics 50 and/or wires 52 that are operatively attached to the detectors 30 (illustrated in FIG. 4). In one possible example, the wires 52 extend through the second chamber 48 to the sensing electronics 50 (illustrated generically in box form for ease of illustration). The sensing electronics 50 may be stored within a housing that is attached to and in fluid communication with the second chamber 48. The sensing electronics 50 can send and/or receive detection signals to/from the detectors 30. In one example, the sensing electronics 50 include a preamplifier board that can receive current from the detectors 30 that is related to atomic particle detection. In another example, the sensing electronics 50 include high voltage electronics, such as in a range of about 1500 volts. Indeed, the sensing electronics 50 include any number of structures, and are not limited to the examples/illustrations described herein.

Figure 3:
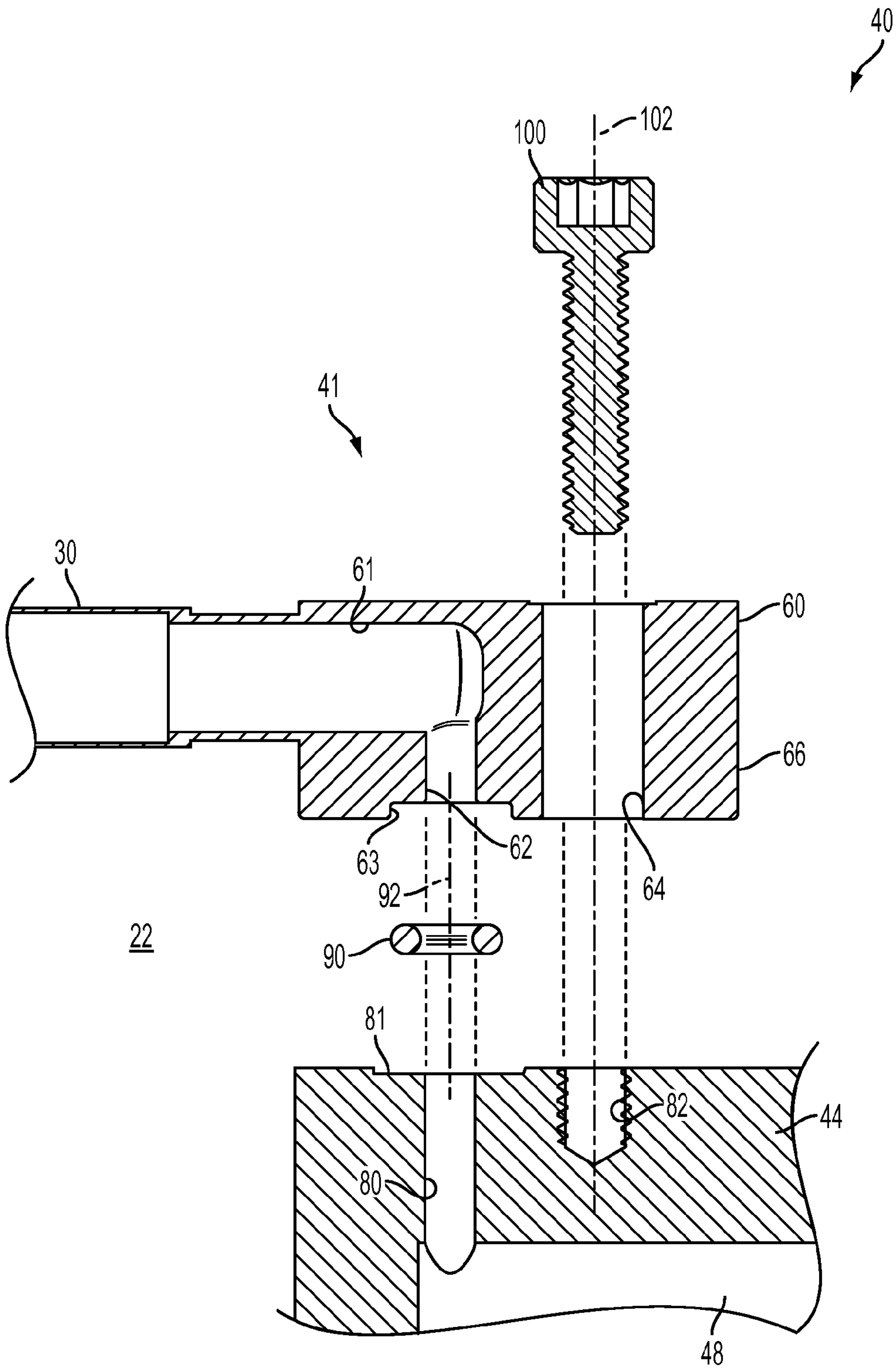
FIG. 3 is an enlarged, exploded, sectional view taken along line 3-3 of FIG. 2 of an end of the detection unit.

Turning now to FIG. 3, a sectional view of the first end 41 of the junction apparatus 40 along line 3-3 of FIG. 2 is illustrated. It will be appreciated that while only the first end 41 of the detection unit 20 is illustrated in FIG. 3, the second end 42 of the detection unit 20, including the junction apparatus 40, second housing 46, etc., is generally identical to the first end 41 and need not be described in detail again. Further, in this example, the junction apparatus 40 is illustrated in a partially exploded state for illustrative purposes.

The junction apparatus 40 includes a first manifold 60 that supports the first end of the detector 30. The first manifold 60 includes any number of materials, including stainless steel, aluminum, etc. In the illustrated example, the first manifold 60 includes a generally rectangular cross-sectional shape, though, other shapes (e.g., quadrilateral shapes, square shapes, rounded shapes, circular shapes, etc.) are envisioned. While FIG. 3 illustrates a single first manifold 60, the remaining first manifolds (illustrated in FIG. 2) are generally identical in size, shape, and/or structure.

The first manifold 60 includes a detector opening 61 through which the detector 30 extends. In some examples, the detector opening 61 extends at least partially into an interior of the first manifold 60. The first manifold 60 can include a first manifold opening 62. In an example, the first manifold opening 62 is in fluid communication with (e.g., connected to) the detector opening 61. While the first manifold opening 62 can extend at any number of angles into the first manifold 60, in the illustrated example, the first manifold opening 62 extends in a generally perpendicular direction with respect to the detector opening 61. The first manifold opening 62 includes a cross-sectional size that is large enough to accommodate/receive the wires 52 (illustrated in FIG. 4) that are attached to the detector 30.

The first manifold 60 includes a manifold recess 63. The manifold recess 63 defines an indentation, groove, depression, etc. extending into the first manifold 60 around the first manifold opening 62. The manifold recess 63 includes any number of shapes, including circular shapes, quadrilateral shapes, etc. In an example, the manifold recess 63 defines a larger cross-sectional size than the first manifold opening 62. The manifold recess 63 can be substantially co-axial with respect to the first manifold opening 62.

The first manifold 60 includes a second manifold opening 64. In some examples, the second manifold opening 64 extends through the first manifold 60 from a first side to an opposing second side. The second manifold opening 64 can extend at any number of angles into the first manifold 60. In the illustrated example, the second manifold opening 64 extends in a generally parallel direction with respect to the first manifold opening 62 and a generally perpendicular direction with respect to the detector opening 61. In some examples, the second manifold opening 64 is located between the first manifold opening 62 and an end 66 of the first manifold 60.

Turning now to the first housing 44, the first housing 44 can include a first housing opening 80. In an example, the first housing opening 80 is in fluid communication with (e.g., connected to) the second chamber 48. While the first housing opening 80 can extend at any number of angles into the first housing 44, in the illustrated example, the first housing opening 80 extends in a generally parallel direction with respect to the first manifold opening 62. In some examples, the first housing opening 80 is oriented so as to be substantially co-axial with respect to the first manifold opening 62 of the first manifold 60. The first housing opening 80 includes a cross-sectional size that is large enough to accommodate/receive the wires 52 (illustrated in FIG. 4) that extend between the detector 30 and the sensing electronics 50 in the second chamber 48.

The first housing 44 includes a housing recess 81. The housing recess 81 defines an indentation, groove, depression, etc. extending into the first housing 44 around the first housing opening 80. The housing recess 81 includes any number of shapes, including circular shapes, quadrilateral shapes, etc. In an example, the housing recess 81 defines a larger cross-sectional size than the first housing opening 80. The housing recess 81 can be substantially co-axial with respect to the first housing opening 80.

The first housing 44 can include a second housing opening 82. In some examples, the second housing opening 82 extends at least partially into the first housing 44. The second housing opening 82 can extend at any number of angles into the first housing 44. In the illustrated example, the second housing opening 82 extends in a generally parallel direction with respect to the first housing opening 80. In some examples, the second housing opening 82 is oriented so as to be substantially co-axial with respect to the second manifold opening 64 of the first manifold 60.

The junction apparatus 40 includes a sealing device 90 that seals the first housing 44 with respect to the first manifold 60. In an example, the sealing device 90 seals the first manifold opening 62 with respect to the first housing opening 80. The sealing device 90 can be positioned between the first manifold opening 62 of the first manifold 60 and the first housing opening 80 of the first housing 44. In some examples, the sealing device 90 includes an internal size (e.g., diameter, etc.) that is larger than a cross-sectional size (e.g., diameter, etc.) of the first manifold opening 62 and first housing opening 80. In some examples, the sealing device 90 includes an external size (e.g., diameter, etc.) that is smaller than a cross-sectional size (e.g., diameter, etc.) of the manifold recess 63 and housing recess 81.

In some examples, the sealing device 90 includes an O-ring comprising an elastically deformable material that can be compressed so as to form a seal. The sealing device 90 includes any number of materials, including rubber, plastic, metal, etc. Any range of forces can be applied to cause the sealing device 90 to compress, such as about 5 pounds of force for relatively softer materials (e.g., rubber, etc.) to about 300 pounds of force for relatively harder materials (e.g., plastics, metals, etc.).

The sealing device 90 can seal the first manifold 60 with respect to the first housing 44 along a sealing axis 92. For example, the first manifold opening 62 of the first manifold 60 extends along the sealing axis 92. Likewise, the first housing opening 80 of the first housing 44 extends along the sealing axis 92. The sealing device 90 can be received within the manifold recess 63 and housing recess 81, such that the sealing device 90 is substantially co-axial with respect to the sealing axis 92. In some examples, the second manifold opening 64 is located between the sealing device 90 and the end 66 of the first manifold 60.

The junction apparatus 40 includes an attachment device 100. It will be appreciated that the attachment device 100 is illustrated somewhat generically/schematically, as the attachment device 100 includes any number of structures. For example, the attachment device 100 includes screws, nuts, bolts, other types of mechanical fasteners, adhesives, or the like. In some examples, the attachment device 100 includes a threading (e.g., male threading) so as to engage a threading (e.g., female threading) of the second housing opening 82.

The attachment device 100 can extend along an attachment axis 102. The attachment axis 102 is substantially parallel to and separated from the sealing axis 92. In some examples, the second manifold opening 64 extends along the attachment axis 102. In some examples, the second housing opening 82 extends along the attachment axis 102.

Turning now to FIG. 4, a sectional view of the first end 41 of the junction apparatus 40 is illustrated. In this example, the junction apparatus 40 is illustrated in a fully formed state. For example, the attachment device 100 extends through the second manifold opening 64 and is attached (e.g., by threading engagement) to the second housing opening 82.

Once the attachment device 100 attaches the first manifold 60 to the first housing 44, the sealing device 90 is supported within the manifold recess 63 and housing recess 81. In some examples, the sealing device 90 can at least partially compress so as to form a seal with the manifold recess 63 and housing recess 81. The sealing device 90 can form a seal around the first manifold opening 62 and first housing opening 80. Accordingly, the first manifold opening 62 and the first housing opening 80 define a pathway 112 between the first manifold 60 and the first housing 44. While being in fluid communication, the first manifold 60 is sealed with respect to the first housing 44. As such, air, gas, fluids, etc. are generally limited from exiting the first manifold opening 62 and/or first housing opening 80 to the first chamber 22.

In some examples, the first manifold 60 and the first housing 44 are maintained at a second operating pressure. The second operating pressure may be different from the first operating pressure of the first chamber 22. In particular, in some possible examples, the second operating pressure is higher than the first operating pressure. The second operating pressure includes a pressure that is generally equivalent to atmospheric pressure, such as about 101 kilopascal (kPa) (14.7 psia). As such, the sensing electronics 50 and wires 52 are maintained at the second operating pressure (e.g., atmospheric pressure, for example). Maintaining the sensing electronics 50 and wires 52 at the second operating pressure is beneficial due, at least in part, to voltage breakdown of high voltage electronics being more likely at pressures below atmospheric pressures (e.g., at pressures within the first chamber 22). Therefore, by storing the sensing electronics 50 at the second operating pressure, which is maintained at a pressure near atmospheric pressure, breakdown of the sensing electronics is less likely.

The sealing device 90 can have a substantially uniform compression between the first manifold 60 and the first housing 44. In particular, a compression force ($F_c$) (illustrated generically/schematically with arrowheads) of the sealing device 90 between the first manifold 60 and first housing 44 is substantially uniform. This is due, at least in part, to the geometry of the first manifold 60. For example, the attachment device 100 can exert an attachment force ($F_a$) that causes a moment of force on the sealing device 90. In an example, the sealing axis 92 is separated a first distance ($d_1$) from the attachment axis 102 defined by an attachment location 110. In some examples, the attachment location 110 is defined as the location through which the attachment axis 102 passes through the second manifold opening 64 and the second housing opening 82. The attachment location 110 is separated a second distance ($d_2$) from the end 66 of the first manifold 60. The sealing axis 92 of the sealing device 90 is separated a third distance ($d_3$) from the end 66 of the first manifold 60.

To provide for the substantially uniform compression force ($F_c$) on the sealing device 90, the first manifold 60 has a length (e.g., third distance ($d_3$)) that is sufficiently long enough to ensure uniform compression of the sealing device 90. In an example, the attachment force ($F_a$) is illustrated in equation (1) as:

$$Fa*d_2>F_c*d_3 \tag{1}$$

Further, it is known that:

$$d_3=d_1+d_2 \tag{2}$$

Solving for $d_2$ with equations (1) and (2) provides that:

$$d_2>d_1*[(F_c)/(F_a-F_c)] \tag{3}$$

Accordingly, as illustrated in equation (3), when the second distance ($d_2$) is greater than the product of the first distance ($d_1$) and the compression force ($F_c$) divided by attachment force ($F_a$) minus compression force ($F_c$), there is a substantially uniform compression of the sealing device 90. This substantially uniform compression reduces leakage of air within the first manifold opening 62 and first housing opening 80, which is maintained at the second operating pressure.

The first distance ($d_1$) includes any number of distances. In some examples, the first distance ($d_1$) is between about 0.25 inches (~6.35 millimeters) to about 0.75 inches (~19.05 millimeters). In one possible example, the first distance ($d_1$) is about 0.5 inches (~12.7 millimeters). The second distance ($d_2$) includes any number of distances. In some examples, the second distance ($d_2$) is between about 0.1 inches (~2.54 millimeters) to about 0.3 inches (~7.62 millimeters). In one possible example, the second distance ($d_2$) is greater than about 0.167 inches (~4.24 millimeters).

The compression force ($F_c$) and attachment force ($F_a$) include any number of forces. In one possible example, the compression force ($F_c$) is between about 10 pounds to about 30 pounds. In an example, the compression force ($F_c$) is about 20 pounds. In one possible example, the attachment force ($F_a$) is between about 60 pounds to about 100 pounds. In an example, the attachment force ($F_a$) is about 80 pounds.

Figure 5:
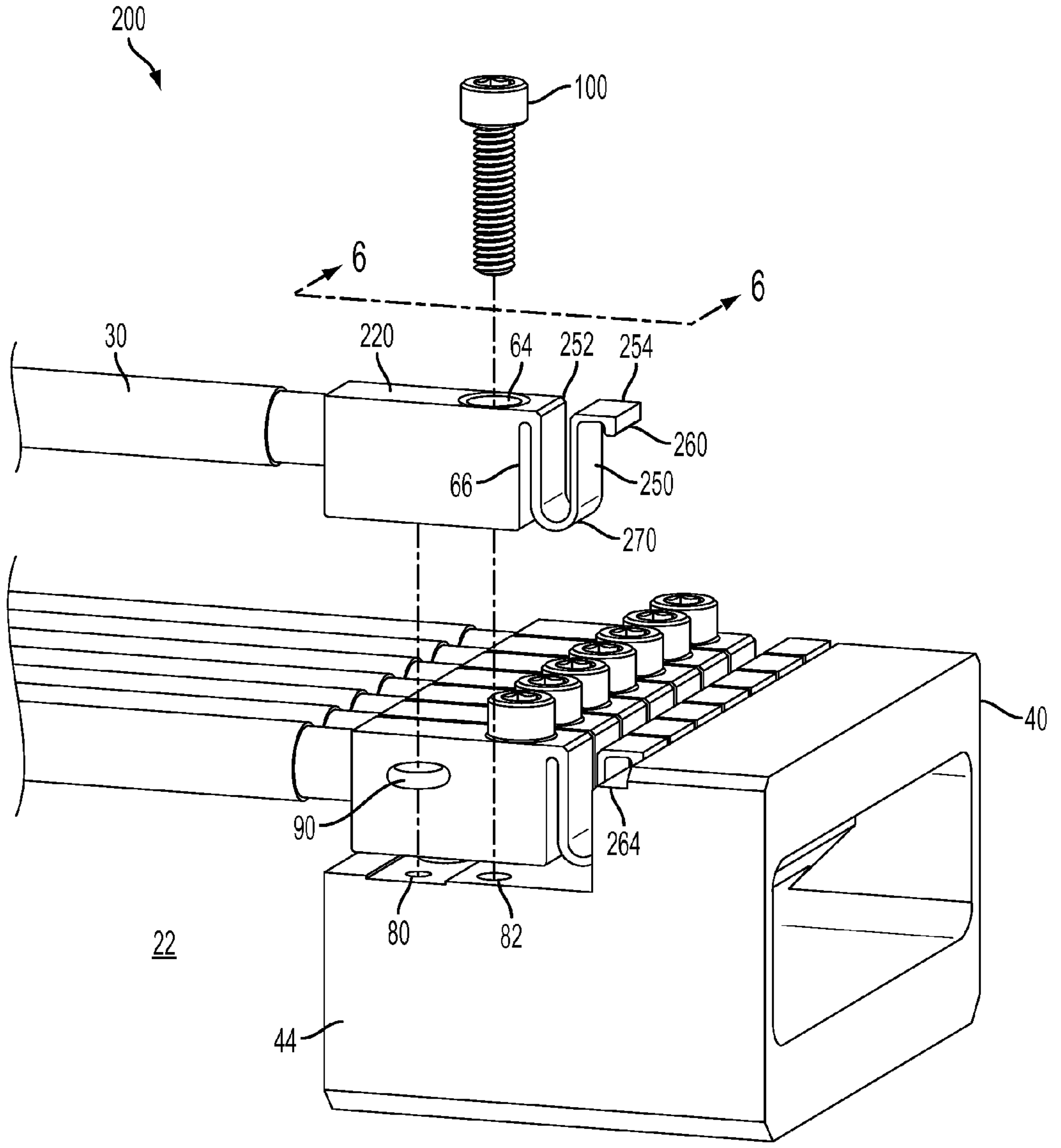
FIG. 5 is a partially torn open perspective view of a second example detection unit for use in an atomic particle detection assembly.

Turning now to FIG. 5, a second example detection unit 200 is illustrated. In this example, the second detection unit 200 includes the detectors 30, junction apparatus 40, first housing 44, etc., such that these structures need not be described in detail again. The second detection unit 200 includes a second example of a first manifold 220. The first manifold 220 includes the detector opening 61, first manifold opening 62, manifold recess 63, second manifold opening 64, end 66, etc. As such, these structures need not be described in detail again.

The first manifold 220 includes a biasing portion 250. In the illustrated example, the biasing portion 250 is located on an opposite side of the first manifold 220 from the detector 30. The biasing portion 250 can be located adjacent the end 66 of the first manifold 220, with the biasing portion 250 extending outwardly in a direction away from the end 66. In some examples, the biasing portion 250 engages the first housing 44 such that the biasing portion 250 can bias the first manifold 220 towards the first housing 44.

Figure 6:
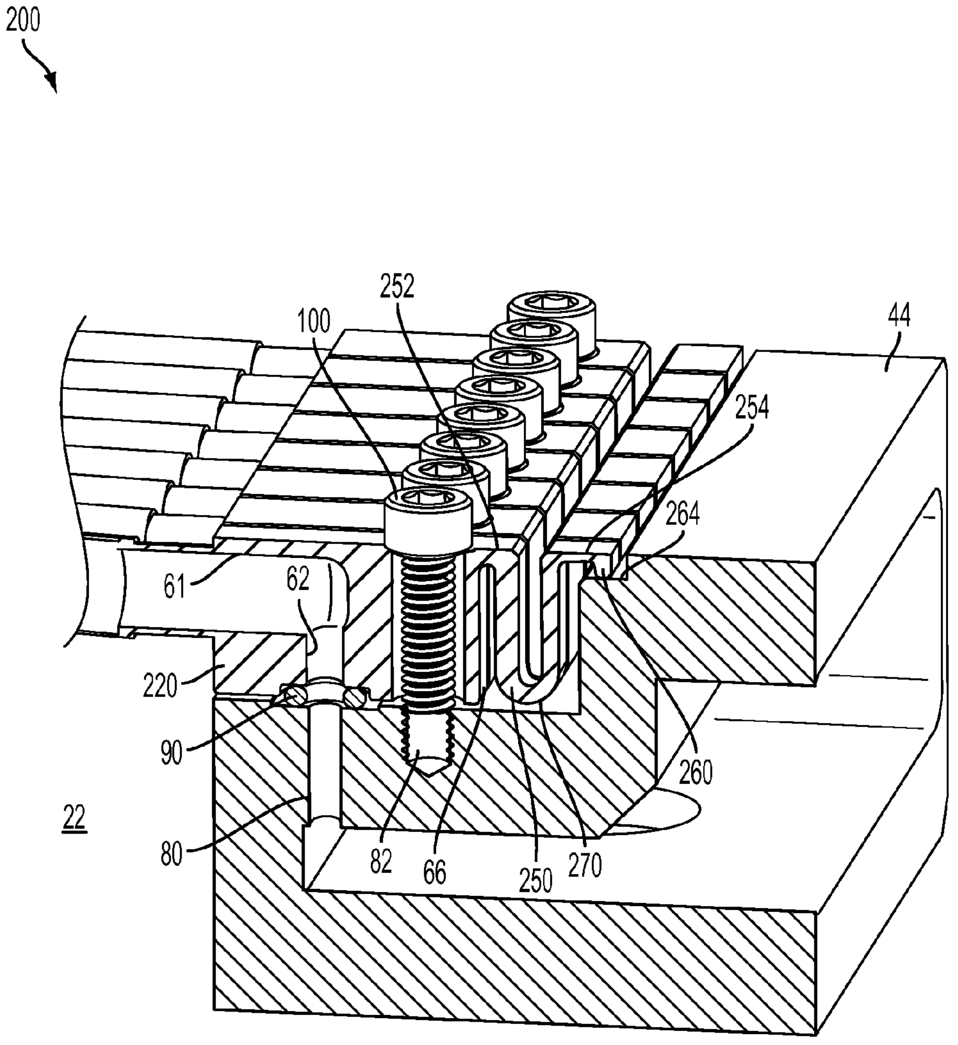
FIG. 6 is a sectional view taken along line 6-6 of FIG. 5 of an end of the detection unit.

Turning now to FIG. 6, a sectional view of the junction apparatus 40 along line 6-6 of FIG. 5 is illustrated. It will be appreciated that in this example, the junction apparatus 40 is illustrated without the detector 30, sensing electronics 50, wires 52, etc. for illustrative purposes. The biasing portion 250 of the first manifold 220 can extend between a first end 252 and an opposing second end 254. The first end 252 can be attached to the end 66 of the first manifold 220. The first end 252 of the biasing portion 250 can be attached in any number of ways, such as by welding, mechanical fasteners (e.g., nuts, bolts, screws, etc.), one piece formation, or the like. In at least some examples, the biasing portion 250 includes the same material(s) as the first manifold 220, such as by being constructed of metals or the like.

The biasing portion 250 includes an engagement portion 260 at the second end 254. In some examples, the engagement portion 260 defines a protrusion, outcropping, protuberance, etc. projecting outwardly from the second end 254. The engagement portion 260 may, in an example, project towards the first housing 44. The engagement portion 260 is not limited to including the protrusion, outcropping, protuberance, etc., and in other examples, may instead define a surface, such as a planar or non-planar surface. The engagement portion 260 can engage a contact portion 264 of the first housing 44. In some examples, the contact portion 264 defines a recess, depression, etc. in the first housing 44 that is sized and shaped to receive the engagement portion 260.

The biasing portion 250 can include a non-linear portion 270 between the first end 252 and the second end 254. In some examples, the non-linear portion 270 includes an undulation, bend, curve, or the like. In the illustrated example, the non-linear portion 270 has a generally rounded shape between two substantially straight (e.g., linearly extending) portions. The non-linear portion 270 can allow for at least some degree of flexibility/pliability of the first end 252 of the biasing portion 250 with respect to the second end 254. For example, the second end 254 can flex, move, bend, etc., with respect to the first end 252 due to the flexibility/pliability of the non-linear portion 270.

Figure 7:
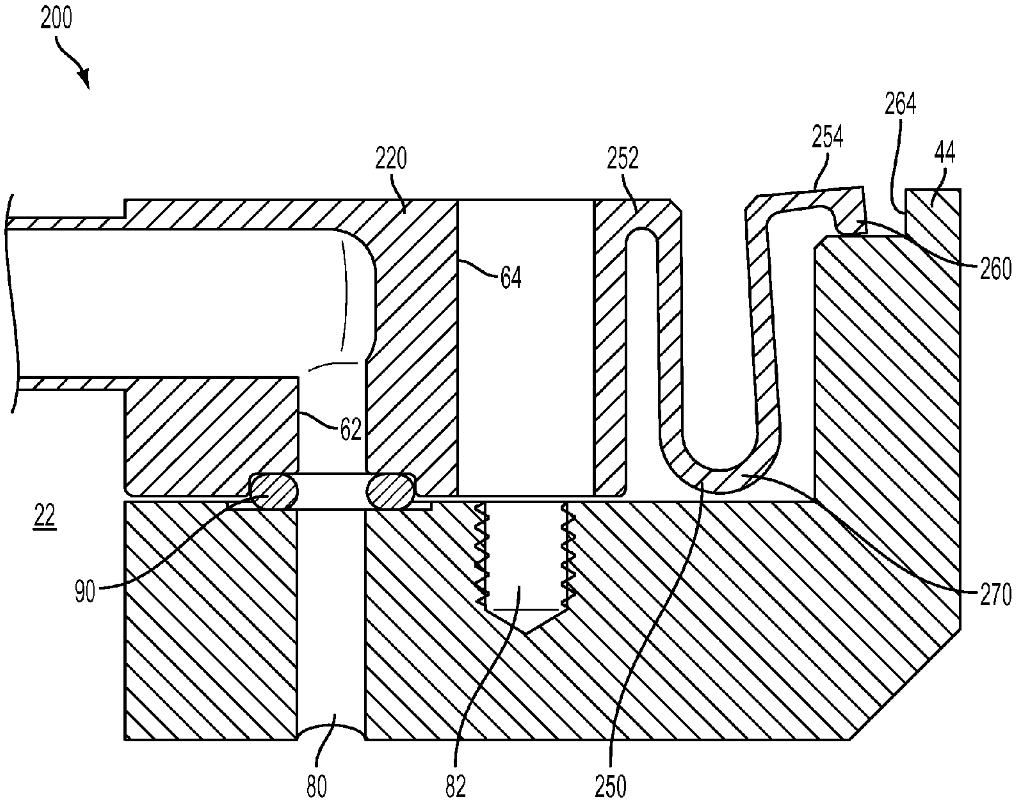
FIG. 7 is a sectional view similar to FIG. 6 with a biasing portion engaging a first housing.

Turning now to FIG. 7, a side sectional view of the junction apparatus 40 is illustrated. For ease of illustration, the junction apparatus 40 is not illustrated with the attachment device 100, though, in normal operation, the attachment device 100 will extend through the second manifold opening 64 and second housing opening 82. As illustrated, the biasing portion 250 includes a decreasing cross-sectional size in a direction away from the first manifold 220. For example, the cross-sectional size of the biasing portion 250 near the first end 252 is larger than the cross-sectional size of the biasing portion 250 near the second end 254. By having the decreasing cross-sectional size, the biasing portion 250 can have a larger degree of flexibility/pliability in response to contacting the contact portion 264.

As the first manifold 220 is attached to the first housing 44, the engagement portion 260 of the biasing portion 250 can engage the contact portion 264 of the first housing 44. The biasing portion 250 is therefore flexible in response to engaging the contact portion 264 of the first housing 44. The biasing portion 250 can assist in providing the substantially uniform compression force ($F_c$) of the sealing device 90 between the first manifold 220 and the first housing 44. In particular, the biasing portion 250 can provide a higher moment force by creating more torque rather than providing a longer first manifold 220.

In some examples, the second detection unit 200 including the first manifold 220 and biasing portion 250 can include the sealing device 90 having a relatively higher degree of stiffness. For example, the sealing device 90 used with the second detection unit 200 may include a metal and/or plastic material. In such an example, the sealing device 90 may have a higher compression force F, (e.g., in the range of about 200 pounds of force to about 300 pounds of force) to provide for substantially uniform compression. The biasing portion 250 can therefore accommodate for sealing devices 90 having this relatively higher compression force $F_c$.

The atomic particle detection assembly 10 provides a number of benefits. For example, the sensing electronics 50 are maintained at the second operating pressure that is different (e.g., higher) than the first operating pressure. The second operating pressure is maintained, at least in part, to the sealing device 90 forming a seal between the first manifold 60, 220 and the first housing 44. In particular, due to the geometry of the first manifold 60, a substantially uniform compression force ($F_c$) is applied to the sealing device 90. Accordingly, the substantially uniform compression force ($F_c$) ensures that the sealing device 90 maintains a relatively tight seal around each of the first manifold opening 62 and first housing opening 80, thus reducing pressure loss.

Maintaining the second operating pressure is beneficial for the sensing electronics 50 and wires 52. For example, voltage breakdown of high voltage electronics may be more likely at pressures below atmospheric pressure (e.g., at pressures within the first chamber 22). Therefore, by maintaining the sensing electronics 50 within an area at the second operating pressure, which is maintained at a pressure near atmospheric pressure, breakdown of the sensing electronics 50 is less likely.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An atomic particle detection assembly including:

at least one detector configured to detect atomic particles; and a junction apparatus supporting the detector, the junction apparatus including a first manifold attached to a first housing at an attachment location, the junction apparatus including a sealing device sealing the first manifold with respect to the first housing along a sealing axis, wherein the sealing axis is substantially parallel to and separated a first distance ($d_1$) from an attachment axis defined by the attachment location.

2. The atomic particle detection assembly of claim 1, wherein the first manifold includes a first manifold opening extending along the sealing axis.

3. The atomic particle detection assembly of claim 2, wherein the first housing includes a first housing opening extending along the sealing axis.

4. The atomic particle detection assembly of claim 3, wherein the first manifold opening is sealed with respect to the first housing opening by the sealing device.

5. The atomic particle detection assembly of claim 4, wherein the first manifold opening and the first housing opening define a pathway between the first manifold and the first housing such that the first manifold and the first housing are maintained at a second operating pressure.

6. The atomic particle detection assembly of claim 5, wherein the detector is positioned within a first chamber having a first operating pressure that is different from the second operating pressure.

7. The atomic particle detection assembly of claim 1, wherein a compression force ($F_c$) of the sealing device between the first manifold and the first housing is substantially uniform.

8. The atomic particle detection assembly of claim 7, wherein the attachment location is located between the sealing device and an end of the first manifold, the attachment location separated a second distance ($d_2$) from the end of the first manifold, the sealing axis of the sealing device separated a third distance ($d_3$) from the end of the first manifold.

9. The atomic particle detection assembly of claim 8, wherein the first housing is attached to the first manifold by an attachment device, the attachment device exerting an attachment force ($F_a$).

10. The atomic particle detection assembly of claim 9, wherein $d_2 > d_1 * [(F_c)/(F_a - F_c)]$.

11. An atomic particle detection assembly including:

at least one detector configured to detect atomic particles; and a junction apparatus supporting the detector, the junction apparatus including:

a first manifold including a first manifold opening;

a first housing including a first housing opening, the first housing attached to the first manifold by an attachment device that extends along an attachment axis; and a sealing device sealing the first manifold opening with respect to the first housing opening, the first manifold opening and the first housing opening extending along a sealing axis, wherein the sealing axis is substantially parallel to and separated a first distance from the attachment axis.

12. The atomic particle detection assembly of claim 11, wherein the first manifold opening and the first housing opening define a pathway between the first manifold and the first housing such that the first manifold and the first housing are maintained at a second operating pressure.

13. The atomic particle detection assembly of claim 12, wherein the detector is positioned within a first chamber having a first operating pressure that is different from the second operating pressure.

14. The atomic particle detection assembly of claim 13, wherein the second operating pressure is higher than the first operating pressure.

15. The atomic particle detection assembly of 11, wherein the first manifold includes a second manifold opening extending along the attachment axis through which the attachment device extends.

16. The atomic particle detection assembly of claim 15, wherein the second manifold opening is located between the sealing device and an end of the first manifold.

17. An atomic particle detection assembly including:

at least one detector configured to detect atomic particles; and a junction apparatus supporting the detector, the junction apparatus including:

a first housing; and a first manifold attached to the first housing at an attachment location, the first manifold including a biasing portion that engages the first housing, the biasing portion configured to bias the first manifold towards the first housing.

18. The atomic particle detection assembly of claim 17, wherein the biasing portion is located on an opposite side of the first manifold from the detector.

19. The atomic particle detection assembly of claim 17, wherein the biasing portion includes a decreasing cross-sectional size in a direction away from the first manifold.

20. The atomic particle detection assembly of claim 17, wherein the biasing portion is flexible in response to engaging the first housing.

* * * * *

UNITED STATES PATENT AND TRADEMARK OFFICE
CERTIFICATE OF CORRECTION

PATENT NO. : 8,921,800 B1
APPLICATION NO. : 14/036084
DATED : December 30, 2014
INVENTOR(S) : Benjamin John Olechnowicz It is certified that error appears in the above-identified patent and that said Letters Patent is hereby corrected as shown below:

Specification

Column 9, line 46, please delete "F," and insert therefor --$F_c$--.

Signed and Sealed this
Second Day of February, 2016

Michelle K. Lee

Michelle K. Lee
*Director of the United States Patent and Trademark Office*